July 20, 1954

J. CLARK

2,683,989

GAUGING DEVICE

Filed Sept. 22, 1948

INVENTOR.
JAMES CLARK
BY
Edward J. Noe
HIS ATTORNEY

July 20, 1954          J. CLARK          2,683,989

GAUGING DEVICE

Filed Sept. 22, 1948          2 Sheets-Sheet 2

INVENTOR.
JAMES CLARK
BY
Edward J. Noé
HIS ATTORNEY

Patented July 20, 1954

2,683,989

UNITED STATES PATENT OFFICE 2,683,989

GAUGING DEVICE

James Clark, Dayton, Ohio

Application September 22, 1948, Serial No. 50,481

1 Claim. (Cl. 73—398)

This invention relates to gauging devices and particularly to devices of the type utilizing changes in the reluctance of a magnetic circuit.

This application is a continuation-in-part of my co-pending applications Serial Nos. 605,175, 736,183 and 749,073, which were filed on July 14, 1945, March 21, 1947, and May 19, 1947, respectively, now Patent Nos. 2,507,501, 2,581,359 and 2,510,073, respectively.

It is an object of this invention to provide a gauging device which has an exceptionally high output, an exceedingly low acceleration response and a low temperature drift.

A further object is the provision of a very compact electrical pressure pickup device having an exceptionally low acceleration response and high electrical output.

A further object is to provide a pressure responsive or pickup device of low acceleration response containing one or two magnetic circuits and containing coils for each magnetic circuit to be controlled thereby according to pressure-induced variations in the reluctance of the magnetic circuits.

A further object is to provide a gauging device having a novel arrangement of an electrical means and a magnetic circuit whose reluctance is varied in the gauging operation, the arrangement enabling the magnetic circuit to control the electrical output in a very efficient manner and enabling the electrical means in the device itself to provide a measurement of the change in reluctance as a result of the gauging operation.

Another object is to provide a gauging device having a novel arrangement of two magnetic circuits and coils for the magnetic circuits, the reluctance of the magnetic circuits being varied inversely and simultaneously in a gauging operation, the arrangement enabling the magnetic circuits to control the output obtained from the coils in a very efficient manner, and enabling the coils in the device itself to provide an electrical measurement of the reluctance changes of the magnetic circuit and thus make the result of the gauging operation conveniently available.

A further object is to provide a pressure pickup device containing a transformer whose output potential varies with variations in pressures applied to the pickup device.

A further object is to provide a pressure pickup device containing two transformers and means to vary the output of the transformers inversely in response to pressure differentials between pressures being indicated and/or measured and a reference pressure.

A further object is to provide a pressure pickup device having a pressure-responsive diaphragm which is flush with, and forms an integral part of, an airfoil or similar surface, having a pair of magnetic circuits and electrical means associated therewith and having means connected to the diaphragm to be operated thereby in response to pressure differentials between pressures on said surface and a reference pressure, to simultaneously and inversely vary the reluctance of the magnetic circuits and thereby vary the electrical effect of the electrical means associated therewith.

A further object is to provide a pressure pickup device of a type to be secured in the wall of a chamber to measure pressure therein, including a pressure-responsive diaphragm which forms an outer surface of the device and is subject to pressures in the chamber, including a pair of magnetic circuits and electrical means associated therewith, and including means operated by the diaphragm in response to pressure differentials between pressures in the chamber and a reference pressure, to simultaneously and inversely vary the reluctance of the magnetic circuits and thereby vary the electrical effect of the electrical means associated therewith.

A further object is to provide a pressure pickup device having, as one outside surface thereof, a diaphragm to which a pressure can be applied and having a transformer whose output is varied in response to deflections of the diaphragm.

Another object is to provide a pressure pickup device containing four inductance coils which can be connected as two or four arms of an inductance bridge whose output varies with variations in pressure applied to the pickup device.

Another object is to provide a pressure pickup device having a diaphragm as a smooth outer portion thereof and containing four inductance coils which can be connected as two or four arms of an inductance bridge whose output can be varied in response to differences in pressures applied to the opposite sides of the diaphragm.

Another object is to provide a novel method of indicating and/or measuring a pressure differential, which includes the utilization of the differences in pressure to vary the voltage induced in the secondary of a transformer.

Another object is to provide a novel method of varying the output of a transformer in response to deflections of a member in a magnetic circuit which couples the primary and the secondary of the transformer.

A further object is to provide a transformer whose primary and secondary are close-coupled by being wound together in interspersed relation on a common portion of a magnetic circuit containing a flexible flux-carrying member which can be deflected to change the length of an air gap in the magnetic circuit and vary its reluctance to thereby vary the output voltage of the transformer.

A further object is to provide a pressure indicating and/or measuring system including a pressure pickup device containing a pair of transformers whose outputs vary inversely with differences in pressures applied to the pickup device, and including a circuit controlled by the transformers, according to the variations of their outputs, for integrating the outputs of the transformers and making the output of the pickup device available to control an indicator, a recorder, or any other apparatus as desired.

A further object is to provide a pressure responsive system including a pressure pickup device containing a transformer whose secondary output varies in response to differences in pressures, and including an output circuit controlled by the transformer for making the output of the pickup device available to control an indicator, a recorder, or any other apparatus, which output circuit can also include a demodulating means for making the output of the pickup device available for controlling a direct current indicator recorder or apparatus if desired.

A further object is to provide a pressure responsive system including a pressure pickup device containing pair of transformers whose output voltages vary inversely with differences in pressures applied to the pickup device, including an output circuit for integrating the output voltages from the secondaries of the transformers and indicating the phase of the integrated voltage, the phase of said integrated voltage shifting 180 degrees from changes from positive to negative pressures with respect to a reference pressure.

A further object is to provide a pressure responsive system including a pressure pickup device containing two pairs of inductance coils, the inductances of the coils in the two pairs varying inversely in response to differences in pressures applied to the pickup device, circuits connecting the coils as either two or four arms of an inductance bridge, input circuits for applying a desired alternating current potential at a desired frequency to the bridge, and an output circuit controlled by the bridge and containing means to indicate the unbalance of the bridge caused by variations in the inductances in the coils in the pressure pickup device.

With these objects and other objects which will become apparent from the description, the drawing and the appended claim, the invention includes certain novel combinations of parts and features of construction, preferred forms or embodiments of which are hereinafter described with reference to the drawings which accompany and form a part of this specification.

The invention, in its preferred form, is shown in its adaptation to a pressure pickup device for gauging or measuring pressure variations applied to a pressure sensitive diaphragm. The pressure pick-up device is especially useful in the measurement of fluid flow, either gaseous or liquid, in measuring pressures either steady or instantaneous, and in evaluating pressure pulses or fluctuations with regard to a reference pressure.

In accordance with the present invention, the pickup device includes one or two magnetic circuits whose reluctance is varied directly or indirectly by differences in pressures applied to opposite sides of a pressure sensitive diaphragm, and windings or coils associated with the magnetic circuits translate the variations in reluctance into electrical outputs or effects which may be used in an electrical circuit for the operation or control of any suitable indicating or recording apparatus or any other device to be controlled according to pressures.

Figure 1:
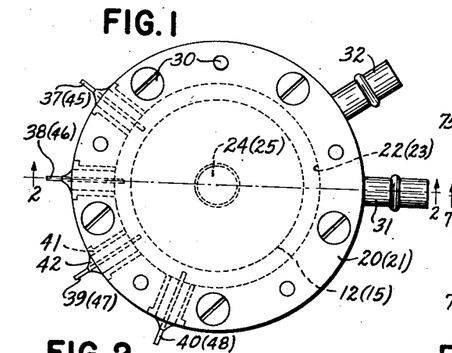
Fig. 1 is a plan view of an embodiment of a pressure pickup device embodying the present invention.
Figure 2:
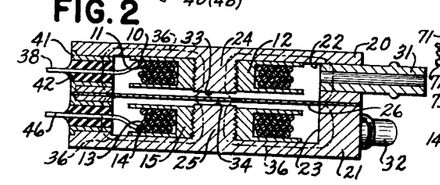
Fig. 2 is a sectional view taken along line 2—2 of Fig. 1.
Figures 3, 4, 5, 8, 9, 10:
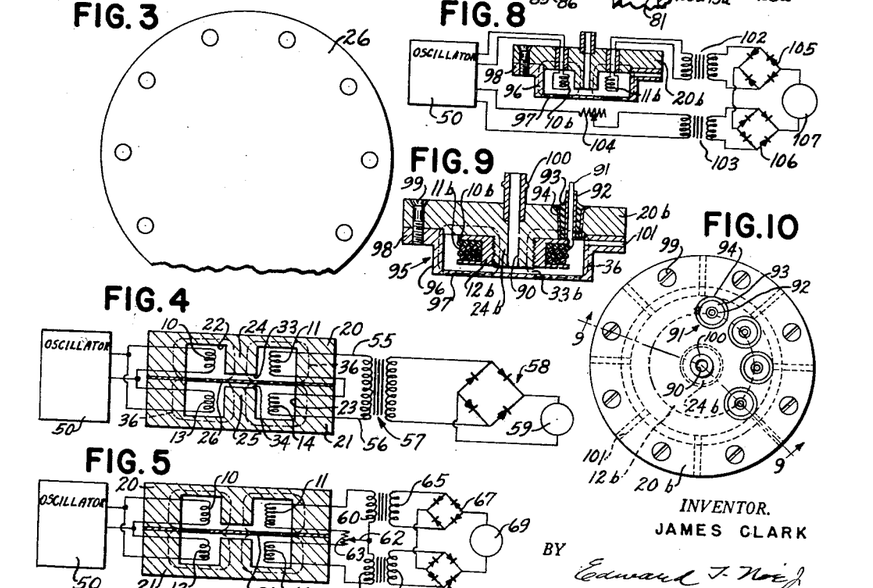
Fig. 3 is a plan view of the diaphragm used in the pressure pickup device of Figs. 1 and 2.
Fig. 4 shows, in schematic form, one circuit that may be used in connection with the pressure pickup devices of Figs. 1, 6 and 17.
Fig. 5 shows, in schematic form, a modification of the circuit of Fig. 4.
Fig. 8 shows, in schematic form, one circuit that can be used with a pressure pickup device which contains one transformer.
Fig. 9 is a central sectional view, taken along the line 9—9 of Fig. 10, showing a pressure pickup device which contains but one magnetic circuit for controlling the output from a transformer in response to pressure.
Fig. 10 is a top plan view of the pressure pickup device of Fig. 9.

In the form of pressure pickup device shown in Figs. 1, 2 and 3, two magnetic circuits are used and the windings associated therewith are the primary and secondary coils of two transformers whose outputs vary with the variations in the reluctance of the magnetic circuits brought about by deflection of a pressure sensitive diaphragm which is a flux carrying member common to the two circuits and which is deflected by differences in pressures applied to opposite sides thereof.

As shown in Figs. 1, 2 and 3, the pressure responsive device is made up of two circular shell-like housing elements 20 and 21 made of magnetic material and formed with annular recesses, as 22 and 23, for receiving coil spools 12 and 15, and also provided with central inwardly disposed pole pieces 24 and 25, on which the coil spools are mounted. As shown in Fig. 2, the coil spools have a threaded connection to the pole pieces.

A disk-like flexible resilient flux-carrying diaphragm 26 (Figs. 2 and 3) of magnetic material is secured at its edges between the peripheral side walls of the shell-like elements 20 and 21, the elements 20 and 21 being drawn into pressure-tight engagement with the diaphragm 26 by any suitable means such as a series of screws 30 extending through holes in one of the elements and the diaphragm and being threaded in the opposing element. The diaphragm 26, through its pressure-tight engagement with the shell-like housing elements 20 and 21, enables the annular recesses 22 and 23 to serve as pressure chambers into one of which a reference pressure may be introduced and into the other of which the pressure whose presence is to be indicated and/or measured may be introduced. Since the diaphragm is only supported at its edges, differences in pressures in the two pressure chambers will cause the free central portion of the diaphragm to be deflected toward one or the other of the pole pieces 24 and 25.

Pressures may be introduced into the pressure chambers by means of pressure fittings 31 and 32, which extend through the side walls of the shell-like elements. The reference pressure may be atmospheric pressure or any other desired pressure above or below atmospheric and the pressure chamber in which the reference pressure is contained may be sealed by sealing the pressure fitting in those cases in which measurements of a variable force or pressure with respect to a known constant pressure is desired. Where a pressure differential is to be determined as for example, in the measurement of rate of flow by the difference in pressure on opposite sides of a restriction, the two pressures are applied to the two pressure chambers through the two fittings.

The shell-like elements 20 and 21, together with the diaphragm 26 form two magnetic circuits each of which contains one air gap, as 33 or 34, between the diaphragm and the pole pieces, as 24 or 25. The paths of the flux generated in the two magnetic circuits when the windings on the coil spools are energized by alternating or pulsating current are in radial directions from or to the central pole pieces as indicated by the dot-and-dash lines 36. For the most effective operation of the pressure pickup device a good magnetic contact between the diaphragm 26 and the shell-like elements 20 and 21 should obtain around their entire periphery. It is to be noted that the diaphragm 26 not only is the element to which the two pressures are applied but also forms an integral flux-carrying part of both magnetic circuits.

With the pressures in the two pressure chambers equal, the air gaps 33 and 34 will be of normal equal lengths, but when there is a change in one or both of the pressures and a difference in pressure exists in the chambers, the free central portion of the diaphragm will be deflected toward one or the other of the pole pieces. This will cause the air gap on one side of the diaphragm to be reduced and at the same time will cause the air gap on the other side of the diaphragm to be increased a corresponding amount.

Due to the short length of the magnetic circuits and to the large area of flux path obtained by the use of the entire periphery of the shell-like elements 20 and 21 as return paths, the air gaps, although only a small fractional part of an inch in length, constitute a major factor in determining the reluctance of the magnetic circuits. Variations in the length of the air gaps produced by pressure differences, therefore, cause pronounced changes in the reluctance of the magnetic circuits, increasing the reluctance of one circuit at the same time reducing the reluctance of the other circuit substantially the same amount, the magnetic circuits being operated below saturation.

It should be noted that, since the magnetic circuits operate below saturation and include the encompassing housing or shell portions 20 and 21 and the central air gaps 33 and 34, which are varied to change the reluctance of the magnetic circuits according to pressure differences, external magnetic fields will have a negligible effect on the response of the device or its operation.

The shell-like element 20 has four electrical terminals, 37, 38, 39 and 40, mounted therein in insulating pressure-tight fittings consisting of bushings 41 and electrical insulating material 42. Terminal ends of the windings on the coil spool 12 are connected to the inner ends of the terminals which extend into the annular recess 22. The shell-like element 21, as shown, also has four electrical terminals, 45, 46, 47, and 48, to which terminal ends of the windings on the coil spool 15 are connected in a similar manner.

The windings on the coil spools in one preferred form of the invention, and as shown in Figs. 1 to 5 inclusive, are transformer windings having primary coils 10 and 13 on the respective pole pieces 24 and 25. Associated with primary coil 10 is a secondary 11 while a secondary 14 is associated with the primary 13. The primary and secondary coils 10 and 11 of one transformer are wound together on the coil spool 12 made of non-magnetic and preferably non-conducting material, and the primary and secondary coils 13 and 14 of the other transformer are wound together on the second coil spool 15 made of material similar to that used in the spool 12. The primary coils 10 and 13 may, if desired, be made of heavier wire and have fewer turns than the secondary coils 11 and 14, in order to provide a greater transformation ratio and to enable greater output voltage changes to be obtained from the secondary coils in response to the pressure differential of the pickup device. By properly choosing the size and number of turns of wire on the primary and secondary coils 10, 13 and 11, 14, respectively, any desired transformation ratios between primary coils and secondary coils can be obtained so that variations in output voltage of the secondaries per unit pressure difference can be provided, and the reflected impedance of the primary and/or secondary can be made to match the reflected impedance of the external circuits with which they are to be used. For the best results, the two transformers should have substantially the same operating characteristics.

The primary and secondary coils of each transformer are preferably wound together in close-coupled relation on the same coil spool, with the turns of the two coils interspersed throughout, although it is not intended that the invention be limited to this particular type of winding. It is also possible to wind two or more secondary coils simultaneously with the primary coil on the same coil spool with the turns of the secondary coils and primary coil being wound in interspersed relation throughout. The secondary coils can be then connected in series in proper phase to give greater output potential changes or in parallel to give greater current output changes, as desired. With this arrangement it is possible, to a limited extent, to match the output impedance of the transformer with an external circuit to be coupled thereto, merely by connecting the several secondary coils associated with the primary coil, in series when a high impedance is desired and in parallel when a lower impedance is desired.

Alternating current applied to the primary coils 10 and 13 of the transformer causes an alternating magnetic flux in the two magnetic circuits which couple the primaries and secondaries of the transformers. This alternating magnetic flux cuts the secondary coils 11 and 14 of the transformers and induces voltages therein dependent upon the amount of flux in their related magnetic circuits, so that, when the diaphragm flexes and inversely varies the amount of flux in the two magnetic circuits, the induced output voltages of the secondary coils will vary correspondingly to provide an indication of the extent of the deflection.

The primary coils 10 and 13 may be connected in series or parallel across the supply potential and so phased as to cause the flux to be additive in the diaphragm 26. With a series connection, it is preferable to use a supply voltage about twice that required for parallel connection.

One circuit that may be employed in connection with the device shown in Figs. 1, 2, and 3 is illustrated in Fig. 4 in which the primaries 10 and 13 of the transformers are connected in parallel to any suitable source of alternating current, such as an oscillator 50, which supplies them with a desired potential at a desired frequency of from sixty cycles or lower up to thousands of cycles per second. Very satisfactory operation has been obtained using 1,000 cycles per second.

The alternating current applied to the primary coils 10 and 13 of the transformers causes an alternating magnetic flux in the two magnetic circuits including the shell-like elements 20 and 21 and the diaphragm 26, which is common to and forms a part of both magnetic circuits. Accordingly a reduction in the length of air gap 33, for example, reducing the reluctance of the magnetic circuit through pole pieces 24 allows more flux to be produced in this magnetic circuit, which causes a greater voltage to be induced in the secondary coil 11. At the same time, an increase in the length of the air gap 34 increases the reluctance of the magnetic circuit through the pole piece 25 decreases the amount of flux that is produced in the magnetic circuit to cause a reduction in the voltage induced in the secondary coil 14. With the secondary coils 11 and 14 connected in series, as shown in Fig. 4, and by properly phasing them, the induced voltage in one coil will be 180 degrees out of phase, electrically, with that induced in the other, and, if the outputs of the coils are properly matched, the induced voltages should add vectorially to produce a normal or "zero" resultant output voltage on leads 55 and 56 when the normal or initial pressures are applied to the pickup device. When a difference in pressure is applied to the device and modifies the reluctance inversely in the two magnetic circuits, it causes the voltage induced in one coil to be increased and the voltage in the other coil to be decreased, which voltages, when added vectorially, give a resultant output voltage across the leads 55 and 56.

The leads 55 and 56 can be connected directly to a suitable alternating current instrument, which can measure the output voltage changes, or can be connected through an impedance matching transformer 57 to an alternating current instrument to measure the output changes directly. The output of the impedance matching transformer can also be connected to a demodulating full-wave rectifier bridge 58, which converts the alternating current output voltage changes to pulsating direct current values for controlling a direct current meter or load, shown diagrammatically at 59, to indicate the presence and/or the magnitude of the pressure difference. Where a full wave rectifier bridge is used, the rectified pulses produced from the alternating current will have twice the frequency of the alternating current applied to the transformer, so the pulses applied to a direct current meter or apparatus will have the effect of a steady direct current voltage because the meter, due to its inertia, cannot follow the pulses per se and will show the envelope of the pulses as a whole.

It should be noted that, with the secondary coils connected in the circuit of Fig. 4, as indicated above, the variations in the induced voltages are cumulative and pronounced. The output variations produced by the transformers are much greater than those which could be heretofore obtained. For example, with a 10 volt input at 1000 cycles per second and a one-to-one transformation ratio in the transformers in the device, the output variation for full scale deflection of a diaphragm normally spaced less than one hundredth of an inch from the pole pieces will be more than one volt across the conductors 55 and 56. Sufficient power can be derived from the transformers to enable a step-up impedance matching transformer to convert the output, on a voltage basis, to a variation of 25 volts or more when it is fed into a one megohm load. If a step-down impedance matching transformer is used, an output, on a current basis, of 1.5 milliamperes or more can be obtained when the output of the impedance matching transformer is fed into a 50 ohm load.

The output variations produced by the transformers also have the further advantage that they are practically in a straight line relation with the pressure differences which cause them.

Fig. 5 shows a circuit similar to the one of Fig. 4 but having the further capabilities of indicating the positive or negative character, or phase, as well as the magnitude, of the pressure difference with respect to a reference pressure and of allowing adjustment of the output circuit to compensate for small differences in the induced voltages when the normal pressures are applied to the opposite sides of the diaphragm 26.

As in the circuit of Fig. 4, the primaries 10 and 13 of the transformers in the circuit of Fig. 5 are connected in parallel to an alternating current source, for example an oscillator 50, and are coupled by the magnetic circuits including the elements 20 and 21 and the diaphragm 26, to the secondary coils 11 and 14, respectively. The secondary coils 11 and 14 are connected in series, electrically 180 degrees out of phase, and each secondary coil is connected across the primary coil, as 60 or 61, of a related impedance matching transformer. The impedance matching transformers should have the same operating characteristics. For normal or initial condition, it is usually desirable for the output voltage from the pressure pickup device to be "zero." Small differences in the voltages induced in the secondary coils 11 and 14 can be compensated externally of the electromagnetic circuit by adjusting a variable resistance or impedance 63 connected by a tapping member 62 between primaries 60 and 61 and connected between the secondary coils 11 and 14. With the secondary coils of the transformers in the pressure pickup device properly compensated, the currents in the primaries 60 and 61 of the impedance matching transformers in the normal or initial condition of the device will cause the voltages induced in the secondary coils 65 and 66 of the impedance matching transformers to be equal and opposite. The secondary coils 65 and 66 can be connected in series and so phased that, for the normal or initial condition, the voltages will cancel out and produce no resultant voltage, but respond to diaphragm movement by resultant voltages indicated by connecting the outer ends of the secondary coils 65 and 66 to an alternating current voltmeter or recording oscillograph. The secondary coils 65 and 66 can also be connected to demodulating rectifier bridges, as 67 and 68 (Fig. 5), which convert the alternating current voltages to pulsating direct current voltages. These rectifier bridges have their outputs connected in series, in proper phase, and in series with a direct current meter or load, shown diagrammatically at 69, which indicates the presence, magnitude and phase, or positive or negative character of changes in the induced voltages caused by any other particular pressure applied to the device with respect to a reference pressure applied to the device.

While it is usual to have the normal or initial resultant voltage "zero," the circuit of Fig. 5 is not limited to this operation and the adjustment of the tapping member 62 relative to the resistor 63 can be such as to provide a predetermined resultant voltage which is other than zero but which will return to "zero" for a predetermined extent of displacement of the diaphragm.

Figure 6:
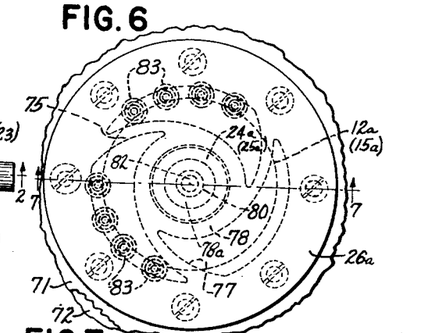
Fig. 6 is a plan view of an embodiment of a pressure pickup device having a flush pressure-responsive diaphragm.
Figure 7:
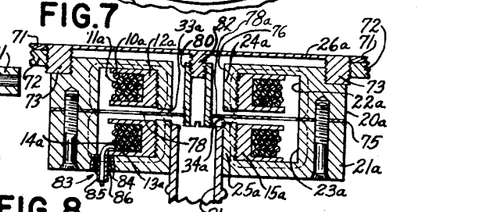
Fig. 7 is a sectional view along the line 7—7 of Fig. 6.

In the embodiment of the invention shown in Figs. 6 and 7, a flush-diaphragm type of pressure responsive device is shown containing a smooth flexible flush-diaphragm 26a adapted to be subjected to an external pressure or force and connected to a flexible flux-conducting diaphragm or member which, when flexed, varies the reluctance of a magnetic circuit or circuits. In this embodiment, the device is particularly suited for use in measuring pressures or pressure fluctuations of a medium in which the flush diaphragm is in direct contact, as on an airfoil or other similar surface. In order to accommodate the pressure device, an airfoil surface 71 has a circular opening about the size of the pickup device and has a frame member 72 secured to the under surface of the airfoil adjacent the edge of the opening. The flush diaphragm 26a has a peripheral flange 73 which has external threads to be screwed in the opening in the airfoil and frame until the diaphragm 26a is flush with and forms an integral part of the airfoil surface.

If the pickup device is to be used in measuring pressures which are produced on an airfoil by passage of a fluid medium thereover at supersonic speeds, then the pickup device can be screwed into the airfoil until the diaphragm 26a is almost flush with the surface and thereafter the diaphragm can be ground to have the exact contour of the airfoil and enable extremely accurate measurements to be obtained.

The windings of this pressure pickup device are preferably similar to those of the device of Figs. 1 and 2, having a primary coil 10a and a secondary coil 11a of one transformer wound together on a coil spool 12a, and having a primary coil 13a and a secondary coil 14a of the other transformer wound together on a coil spool 15a.

This pickup device includes a shell-like housing element 20a of magnetic material, which is formed with a peripheral side wall and a central inwardly-disposed pole piece 24a, the side wall and the pole pieces together forming an annular recess 22a in the element 20a for receiving the coil spool 12a, which is mounted on the pole piece preferably by means of screw threads. The pole piece 24a has an opening 76 therein, which extends through the shell-like element. A shell-like housing element 21a of magnetic material, similar to the element 20a has an annular recess 23a formed by a peripheral side wall and a central, inwardly-disposed hollow pole piece 25a on which the coil spool 15a is mounted. A flat disk-like flexible flux-carrying diaphragm or member 75, which is secured between the peripheral side walls of the shell-like elements 20a and 21a with a pressure-tight engagement, has a plurality of apertures 77 therein and a central portion 78 opposite the central inwardly-disposed pole pieces 24a and 25a.

In a manner similar to that of the pickup device of Figs. 1 and 2, the shell-like elements 20a and 21a, together with the member 75 (Figs. 6 and 7), form the two magnetic circuits which couple the primaries and the secondaries of the transformers. Each magnetic circuit contains an air gap, as 33a or 34a, between the pole pieces 24a or 25a and the member 75 which is common to and forms an integral part of both magnetic circuits. When the member 75 is flexed, it will vary the air gaps inversely to thereby vary the reluctance of the magnetic circuits and cause variations in the voltages induced in the secondary coils of the transformers.

The resilient flush diaphragm 26a, which may be a thin disk of Phosphor bronze, steel or other suitable material, is shown secured to the shell-like element 20a by a threaded reduced portion of the shell-like element 20a, upon which the diaphragm may be screwed, using threads on the inside of the flange 73. The central portion 78 of the flux conducting member 75, which is a perforate diaphragm, is connected to the diaphragm 26a by a sleeve 80, which extends through the opening 76 in the pole piece 24a and which is preferably made of the same material as the element 20a.

The sleeve 80 has a threaded connection with a projection 82 on the inside of the diaphragm 26a and has a threaded connection with a ring 78a of non-magnetic material secured in the central portion 78 of the member 75. The ring 78a magnetically insulates the diaphragm 26a from the member 75 to prevent an undesired flux return path through the diaphragm 26a when this diaphragm is made of magnetic material. The threads on the projection 82 are of different lead than those on the ring 78a so that by rotating the sleeve 80 the effective length of the connection can be adjusted to control the distance between the diaphragm 26a and the member 75. This connection enables the member 75 to be flexed by the diaphragm 26a to change the reluctance of the magnetic circuits.

A pressure fitting 81 is secured in the opening in the pole piece 25a and enables a reference pressure to be applied through the apertures 77 in the member 75 to the under side of the diaphragm 26a. As in the case with the pickup device shown in Figs. 1, 2, and 3, the reference pressure may be sealed in the pickup device by closing the fitting 81.

The body portion of the device has eight pressure-tight terminal fittings 83, shown in the element 21a, through which the ends of the primary and secondary coils of the transformers can be brought from the device, the ends of the coils 10a and 11a extending through an aperture 77 in the member 75 to the terminal fittings. Each fitting consists of an outer sleeve 84, an inner sleeve 85, and an insulating material 86 therebetween. The ends of the coils pass through the inner sleeves 85, and the sleeves are sealed by solder or other material to make them pressure-tight.

Since the embodiment of the pressure pickup device shown in Figs. 6 and 7 includes two transformers whose outputs vary with differences in pressure, it is thus similar to the embodiment shown in Figs. 1, 2, and 3, and it is obvious that the transformers in the embodiment of Figs. 6 and 7 can be connected in the circuits shown in Figs. 4 and 5 to operate or control meters or loads in response to differences in pressures in the manner fully explained earlier herein. This arrangement can also be used in gauging or measuring pressure fluctuations, or forces applied directly as in gauging the size of objects by displacing a gauging member effective on the member 89, the output voltages of the transformers indicating the extent of deflection by the object.

In the embodiment of the invention shown in Figs. 8, 9, and 10, a flush-diaphragm type of pressure pickup device is shown containing only one transformer and a single magnetic circuit. In this arrangement, the primary coil 10b and the secondary coil 11b of the transformer are wound, preferably in close-coupled interspersed relation, on a coil spool 12b, which is secured on a pole piece 24b extending from the central portion of a round disk-like member 20b of magnetic material. The ends of the coils 10b and 11b are brought from the pressure pickup device through pressure-tight insulating fittings 91, each consisting of an inner sleeve 92, insulating material 93, and an outer sleeve 94 which is mounted in the member 20b, the ends of the coils passing through the inner sleeves 92 and being sealed therein by any suitable sealing means such as solder, wax, etc.

A round cup-shaped member 95, having a peripheral side wall 96, a bottom wall 97 which forms a flush, resilient diaphragm, and a mounting flange 98, cooperates with the housing member 20b to form the magnetic circuit whose reluctance is varied to vary the output of the transformer. The side wall 96 and flange 98 are substantially thicker than the bottom wall 97, so that the bottom wall only will flex. Screws 99 extend through the member 20b and the flange 98 and secure these parts together in a pressure-tight manner with a good magnetic contact between the members.

With the member 95 secured to the member 20b, the pole piece 24b extends almost to the flexible flux conducting diaphragm or bottom wall 97 to form an air gap 33b, which can be varied to vary the reluctance of the magnetic circuit when the bottom wall 97, or diaphragm, is flexed by differences in pressures applied to opposite sides thereof. The flux path in the magnetic circuit is radial from the central pole piece as shown by the dot and dash lines 36.

A hole 90 in the pole piece 24b and a pressure fitting 100, provide for the supply of a reference pressure to one side of the diaphragm, or, if desired, provide the means through which a coolant can be supplied to provide a reference pressure while keeping the bottom wall or diaphragm at a relatively constant temperature when the device is used to measure the pressure of a gas or liquid at high temperatures, as when measuring pressures during the firing of internal combustion engines. When the pickup device is to be supplied with coolant through the pressure fitting 100, the flange 98 is provided with ports 101, through which the coolant can escape. When the device is to be used merely with a reference pressure applied through the pressure fitting 100, or with a reference pressure sealed in the device, the ports 101 will be omitted from the flange 98 or will be closed. Where the pressure pickup device is intended to measure or record explosive pressures as during the firing of a combustion engine, the cup-shaped member 95 is made the same diameter as a conventional spark plug and adapted for fastening in the cylinder opening which normally receives the spark plug, so that the diaphragm is inside of the cylinder.

As in the embodiment shown in Figs. 1 and 2, the diaphragm 97 not only is the member to which the different pressures are applied but also is an integral part of the magnetic circuit.

Referring to the circuit diagram of Fig. 8 showing how the transformer coils 10b and 11b may be connected in a circuit for measuring the magnitude and indicating the positive or negative character of a pressure relative to a reference pressure, it is seen that the primary is connected to a suitable alternating current source, as, for example, an oscillator 50, which supplies it with a desired alternating current potential at a desired frequency. The secondary coil 11b is connected to the primary coil of an impedance-matching transformer 102. A second transformer 103, similar to the impedance-matching transformer 102, is connected to the oscillator 50 by a circuit which includes a resistor 104, by means of which circuit alternating current, of the same frequency and electrically 180 degrees out of phase with the current applied to the primary 10b of the transformer, is applied to the primary of the transformer 103. The resistor 104 can be adjusted to cause the potential induced in the secondary of the transformer 103 to be equal to that induced in the secondary of the transformer 102 with the pressure pickup device in its normal or initial condition so that, if the secondaries are connected in series and properly phased, the voltages in the secondaries will cancel out and produce zero resultant voltage across the free ends of the secondaries, until the diaphragm is deflected and then the resultant voltage can be measured by an alternating current voltmeter or the like.

The secondaries of the transformers 102 and 103 can be connected to demodulating rectifier bridges 105 and 106, similar to those shown in the circuit of Fig. 5, to convert the alternating current voltages in the secondary coils of the transformers into pulsating direct current voltages. By connecting the output of the rectifier bridges in series, in proper phase, and in series with a direct current meter or load 107, as shown in Fig. 8, the variations in the magnitude of pressures as compared to a reference pressure and also the positive or negative character, or phase, can be made available to control an indicating instrument or other apparatus as desired.

From the description of Figs. 8, 9 and 10 it will be apparent that the construction shown in Figs. 1 and 2 and the construction of Figs. 6 and 7, are operative, although considerably less effective, when only one of the circular shell-like elements is used with a pressure sensitive resilient flux conducting diaphragm secured to the rim portion to provide only a single flux conducting path and a single pressure chamber into which the variable pressure may be introduced or which may be sealed at atmospheric or other pressure.

Figures 11, 12, 13, 14, 16, 17, 18:
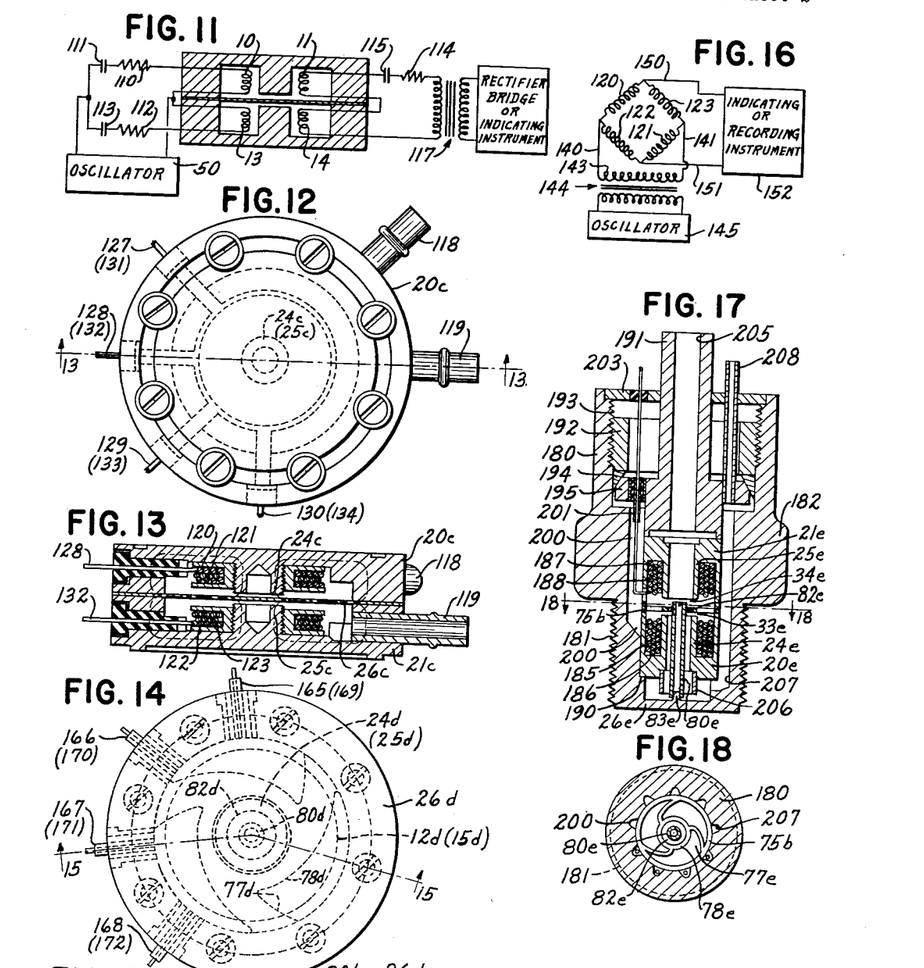
Fig. 11 shows, in schematic form, another circuit that may be used in connection with the pressure pickup devices.
Fig. 12 is a plan view of another embodiment of the pickup device.
Fig. 13 is a sectional view taken on the line 13—13 of Fig. 12.
Fig. 14 is a plan view of a pressure sensitive device having an external operating member positively connected to the flux conducting diaphragm.
Fig. 16 shows, in diagrammatic form, how the windings of the pressure sensitive device may be connected as elements of a bridge circuit.
Fig. 17 is a central sectional view of another modification of a pressure sensitive electromagnetic device having an external operating member connected to the flexible diaphragm.
Fig. 18 is a section on the line 18—18 of Fig. 17.

The output of the transformers contained in the devices heretofore described can be increased, if desired, by inserting resistance and capacitance in their input and/or their output circuits, so that these circuits will be resonant at the frequency of the input potential applied thereto. Fig. 11 illustrates this type of resonant circuit in a pressure-responsive system basically similar to that shown in Fig. 4, and the manner in which this feature also can be applied in the circuits of Figs. 5 and 8 will be apparent. Inserted between the source of alternating current potential 50 (Fig. 11) and the primary coil 10 of one of the transformers and in series therewith are a resistor 110 and a capacitor 111, and inserted between the source of potential 50 and the primary coil 13 of the other transformer and in series therewith are a resistor 112 and a capacitor 113. By using the proper size capacitors 111 and 113, capacitative reactance can substantially cancel out the inductive reactance of the primary coils and reduce the effective impedance of the input circuits. In a similar manner, the output series circuit connecting the secondary coils 11 and 14 can include a resistor 114 and a capacitor 115 of proper value to reduce the effective impedance of the output circuit. The output circuit is coupled through an impedance matching transformer 117 to a rectifier bridge, as shown in Fig. 4, or to an alternating current meter or apparatus.

Figs. 12 and 13 show a pressure pickup device having variable reluctance magnetic circuits similar to those shown in Figs. 1, 2, and 3, including two magnetic circuits formed by the shell-like housing elements 20c and 21c of magnetic material and a resilient flux-carrying diaphragm 26c of the same type of material, the diaphragm being secured between the elements and cooperating with recesses in the elements to form two pressure chambers into which a pressure to be measured and a reference pressure can be introduced through pressure fittings 118, 119 and applied to opposite sides of the diaphragm. The diaphragm is common to the two magnetic circuits and cooperates with a central pole piece on each element as 24c and 25c to form an air gap in each magnetic circuit, the diaphragm forming one side of both air gaps and varying their length and the reluctance of the magnetic circuits inversely as the diaphragm is deflected by differences in pressures applied to opposite sides thereof.

Mounted on each of the pole pieces on opposite sides of the diaphragm, are a pair of induction coils 120 and 121, and 122 and 123. These coils preferably have the same number of turns and are of the same size wire, so that they will normally have the same inductance and will have corresponding variations in inductance for variations in the reluctance of their related magnetic circuits.

The ends of the coils 120 and 121 are connected to insulated pressure-tight terminal fittings 127, 128, 129 and 130 in element 20c, and the ends of coils 122 and 123 are connected to similar terminal fittings 131, 132, 133, and 134 in the element 21c.

The pickup element which contains four inductance coils is quite versatile in its use because the coils can be connected to form two or four arms of an inductance bridge even though that would make them incapable of the high output of the transformer action as heretofore described. Where the coils in the device form two arms of an alternating current bridge, then coils 120 and 121 whose inductance varies in like manner can be connected either in series or parallel to be used as one arm of the bridge and coils 122 and 123 can be similarly connected together in series or parallel relation to be used as another and adjacent arm of the bridge. Suitable resistors or inductances can be provided externally of the device to form the other two arms of the bridge.

If it is desired to use the coils in the device as four arms of an inductance bridge then each of the coils will be used individually, with the coils of a pair whose inductance varies in like manner being connected as non-adjacent arms of the bridge. Such an arrangement is desirable to keep the bridge in proper balance despite temperature changes, since all the bridge arms, being in the device, will be similarly affected by temperature.

Whether the coils are used as two or four arms of a bridge, variations in the reluctance of their magnetic circuits will change their inductive reactance when they are used in an alternating current bridge and will cause changes in the bridge balance to occur and provide an indication of the change in reluctance of the magnetic circuits.

Fig. 16 shows a schematic circuit arrangement in which the coils of the pickup device are connected to form the four arms of an inductance bridge. Alternating current having the desired frequency is supplied over conductors 140 and 141, which are connected to the bridge between coils 120 and 122 and between coils 121 and 123, respectively, and which extend from the secondary 143 of a transformer 144 that has alternating current impressed thereon by any suitable source of alternating current, as, for example, an oscillator, shown schematically at 145.

The output of the bridge, in the form of a voltage change, is taken off by means of conductors 150 and 151, which are connected to the bridge between coils 120 and 123 and between coils 122 and 121, respectively, and which extend to an indicating or recording instrument, as 152, or any other suitable apparatus which indicates or records the unbalance of the bridge caused by changes in the inductance of the coils in response to pressure differences on the diaphragm. If required, the output from the bridge may be amplified by any suitable amplifying means before being applied to the indicating or recording instrument.

The pickup device containing four inductance coils which may form the four arms of an alternating current inductance bridge has several advantages. It eliminates the need for external circuit elements to form the arms of the bridge.

It simplifies the operation of the pressure-responsive system because if the coils in the pickup device are properly balanced when the pickup device is made and always cooperate in the same manner in the bridge, there will be very little, if any, requirement of balancing of the bridge each time the system is used. It also minimizes the effect of temperature changes in the pickup device because all four arms of the bridge will be similarly affected. It also amplifies the resultant effect because the inductances and consequently the inductive reactance of all four arms of the bridge are varied in response to pressure differences, and, with the coils connected as shown in Fig. 16, larger variations in output voltage can be obtained for a given pressure difference than is the case when only two arms of the bridge are affected by pressure differences.

Figure 15:
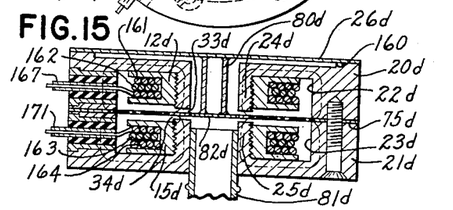
Fig. 15 is a section on the line 15—15 of Fig. 14.

Figs. 14 and 15 show a flush-diaphragm type of pressure pickup device similar to the one shown in Figs. 6 and 7 in that it contains two magnetic circuits, a smooth outer flexible diaphragm 26d, which may for example be a sheet of steel or Phosphor bronze adapted to be acted upon by pressure differentials, and a flexible resilient flux-carrying diaphragm or member 75d within the device and operated by the diaphragm 26d to vary the reluctance of the magnetic circuits.

As shown in Fig. 15, the pickup device contains two shell-like housing elements 20d and 21d of magnetic material which are formed with peripheral side walls and central hollow pole pieces 24d and 25d, the side walls and pole pieces forming annular recesses 22d and 23d for receiving the coil spools 12d and 15d.

The flexible flux-carrying diaphragm member 75d, which is secured between the peripheral side walls of the elements 20d and 21d with pressure tight engagement, is formed with a plurality of apertures 77d and a central portion 78d opposite the pole pieces 24d and 25d, which central portion may, if desired, contain an insert 82d of non-magnetic material.

The smooth outer diaphragm 26d is secured in spaced relation to the element 20d by being secured in pressure-tight manner, as by welding, brazing or other suitable means, to a peripheral ridge 160 on the element 20d. A tubular member 80d, which extends through the hollow pole piece 24d, is secured to the central free portion of the outer diaphragm 26d and to the insert 82d in the center of the flexible flux-carrying member 75d to cause the member 75d to be flexed according to deflections of the smooth outer diaphragm 26d. The tubular member 80d and the member 75d are preferably made of the same material as the elements 20d and 21d.

A pressure fitting 81d secured in the hollow pole piece 25d enables a pressure to be applied through the recesses 22d and 23d and the apertures 77d to the inner side of the outer diaphragm 26d to control the amount of deflection which will occur in the outer diaphragm when other pressures are applied to the outer surface thereof.

In a manner similar to that of the pickup device shown in Figs. 6 and 7, the shell-like elements 20d and 21d together with the member 75d form two magnetic circuits, each magnetic circuit containing one air gap, as 33d or 34d, between the pole pieces 24d and 25d and the member 75d which is common to and forms an integral part of both magnetic circuits. The insert 82d of non-magnetic material isolates the diaphragm 26d from the magnetic circuit in the element 20d to prevent the diaphragm 26d from providing an undesirable return flux path if the diaphragm 26d is of flux conducting material.

Two pairs of inductance coils 161 and 162, and 163 and 164 similar to those used in the pickup device shown in Figs. 12 and 13 are contained on the spools 12d and 15d mounted on the pole pieces 24d and 25d, respectively on opposite sides of the flexible flux-carrying member 75d. These coils preferably have the same number of turns and are of the same size wire so that they will normally have the same inductance and will have corresponding variations in inductance for variations in the reluctance of their related magnetic circuits.

The ends of the coils 161 and 162 extend through insulated pressure-tight fittings 165, 166, 167 and 168 in the element 20d, and the ends of the coils 163 and 164 extend through insulated pressure-tight fittings 169, 170, 171 and 172 in the element 21d to enable the coils to be connected to external circuits.

As in the case of the coils of the pickup device shown in Figs. 12 and 13, the coils 161, 162, 163, and 164 can be utilized individually to form four arms of an inductance bridge in a circuit similar to the one shown in Fig. 16, with the coils of a pair forming non-adjacent arms of the bridge, or the coils of each pair can be connected together, in series or in parallel relation, to form one arm of an alternating current bridge, the other two arms of the bridge being formed by suitable resistors or inductances external to the pickup device.

With normal pressures on the diaphragm 26d, the flux-carrying member 75d will form equal length air gaps in the two magnetic circuits so that the reluctance of the magnetic circuits and the inductances of the coils will be substantially equal. However, when differences in pressures are applied to opposite sides of the outer diaphragm 26d and cause its center to be deflected, it will, through the tubular member 80d cause the flexible flux-carrying member 75d to flex a corresponding amount and vary the lengths of the air gaps inversely to inversely vary the reluctance of the magnetic circuits and the inductance of the pairs of coils related thereto. This will cause the inductive reactance of the coils to vary and unbalance the bridge, resulting in a voltage change which can be used to control an instrument or other apparatus.

It is obvious that either or both of the means shown in Figs. 6 and 7 for connecting the outer smooth diaphragm to the shell-like element and to the flexible flux-carrying member could be used in the pickup device shown in Figs. 14 and 15 and vice versa without essentially changing their modes of operation.

Figs. 17 and 18 show how the flush-diaphragm type of pickup devices shown in Figs. 6, 7, 14, and 15 can be made in the form of a plug which can be screwed in place to measure pressures in a chamber such as the combustion chamber of an engine or other apparatus. The outer smooth resilient diaphragm 26e to which pressure differentials are applied is formed as a part of a hollow housing 180 having threads 181 and wrench-receiving portion 182 to enable it to be screwed in a threaded opening in the cylinder. Within the hollow housing 180 are two magnetic circuits consisting of shell-like housing elements 20e and 21e of magnetic material and a flexible flux-carrying member or diaphragm which is common to and forms an integral part of both magnetic circuits.

Each of the shell-like elements in which the member 75b is housed is formed with a hollow pole piece, as 24e or 25e, and with a peripheral side wall. The pole pieces and side walls of these elements form annular recesses in each of which two coils, as 185 and 186 or 187 and 188, may be placed.

The shell-like elements 24e rests on a shoulder 190 in the bottom of the housing 180 and the flexible flux-carrying member 75b or diaphragm is clamped between the peripheral side walls of the shell-like elements 20e and 21e by means of a pressure member 191 which is forced into engagement with the shell-like element 21e by an annular nut 192 in threaded engagement with a threaded portion 193 of the upper end of the housing. A sealing ring 194 between the annular nut 192 and a shoulder 195 on the pressure member 191 provides a pressure-tight seal between the pressure member 191 and the housing 180, and serves, as the annular nut 192 is forced downwardly, to force the pressure member 191 downwardly and thereby press the element 20e against the shoulder 190 and clamp the flux-carrying member 75b between the elements to obtain a good magnetic contact between the member and the elements.

The flexible flux-carrying member 75b has a plurality of apertures 77e and has a central portion 78e opposite the pole pieces 24e and 25e which contains an insert or ring 82e of non-magnetic material. The member 75b is supported at its periphery and is equidistantly spaced a short distance from each of the pole pieces to provide one air gap, as 33e or 34e, in each magnetic circuit.

The flux-carrying member 75b is connected to the smooth outer diaphragm 26e by a tubular member 80e which extends through the hollow pole piece 24e and has threaded engagement with the ring 82e in the member 75e and with a projection 83e extending from the inner surface of the diaphragm 26e. The lead of the threads in the connection between the member 80e and the ring 82e is shorter than the lead of the threads in the connection between the member 80e and the projection 83e to enable the distance between the member 75e and the diaphragm 26e to be adjusted merely by turning the member 80e.

The pressure member 191 is provided with an opening 205 through which a reference pressure is applied, through the hollow pole pieces 24e and 25e and apertures 77e in the member 75b, to the inner surface of the diaphragm 26e. If desired the reference pressure may be in the form of a coolant which is supplied through the opening 205. An annular baffle 206 may be employed to cause flow of the coolant against the inner surface of the diaphragm 26e, and a channel 207 in the housing 180 and a tube 208 mounted in the shoulder 195 allows the coolant to escape or be returned to the supply for further use.

As the diaphragm 26e is flexed in response to an applied force or pressure, it will flex the member 75b a corresponding amount and cause the air gap on one side of the member to be shortened and the air gap on the other side of the member to be lengthened correspondingly to vary the reluctance of the magnetic circuits inversely.

The coils 185 and 186 are mounted on the pole piece 24e and the coils 187 and 188 are mounted on the pole piece 25e. These coils may be the primaries and secondaries of transformers as in the device shown in Figs. 6 and 7 or may be inductance coils adapted to form arms of an A. C. bridge as in the device shown in Figs. 14 and 15. Pressure-induced variations in the reluctance of the magnetic circuits will vary the output voltages of the secondary coils if a transformer connection is used and will vary the inductance of the coils if the bridge connection is used.

The eight ends of the coils 185, 186, 187, and 188 extend through eight channels 200 spaced circumferentially in the housing 180 and through eight correspondingly spaced insulating pressure-tight fittings 201 in the shoulder 195 and insulating collars in a cover plate 203 where they are available for connection to external circuits. The coils can be connected in appropriate external circuit arrangements as described earlier herein and utilized to control an indicating apparatus such as a recording oscillograph or other means, as desired, according to differences in pressures applied to the device.

Attention is called to the fact that the electro-magnetic devices of this invention have a very low acceleration response and are unaffected by mechanical shock because the only movable element therein has a very small mass and is supported around its periphery. This is especially true of the modifications in which the flexible flux-conducting diaphragm is, itself, the part which is subjected to pressure differentials. Furthermore the natural period of vibration of such a movable element is very high and far above the frequency of pressure oscillations to which the device would ordinarily be subjected.

The response of the pressure pickup devices can be controlled to determine the pressure range in which they are to operate merely by controlling the thickness and/or diameter of the diaphragms and the type of material from which they are made.

In accordance with the invention the flux conducting path for any winding is almost entirely magnetic, with a single very short air gap so that variations of the air gap have a comparatively large effect on the output. With the flux-conducting diaphragm supported in the manner described, friction is entirely eliminated and in case the diaphragm is subjected to large overload the only effect is to move the diaphragm into contact with a pole piece and thus brace the diaphragm at its center portions to prevent unduly straining the diaphragm. An additional advantage of the construction employed where the windings act as the primary and secondary of transformers is that the curve of the output voltage is linear.

As has been stated earlier herein, the pressure pickup devices of the invention have very stable thermal characteristics since the magnetic circuits are so arranged and the coils are so contained in the devices that temperature effects cancel out and do not cause any appreciable variation in the output of the devices. The temperature stability can further be enhanced by the proper choice of materials from which the components of the devices are made. For instance, the various parts, such as the flux-conducting diaphragms or members and the shell-like or housing elements can be made of a material having a low thermal coefficient of expansion such as the iron-nickel alloy "Invar," the coils can be wound with a wire having a low thermal coefficient of electrical resistivity such as the copper-nickel alloy known as "Copel," and the pressure-tight insulating terminal fittings can be made of the alloy known as "Kovar" with a glass of substantially the same coefficient of expansion as "Kovar" for the insulating material. Excellent temperature stability has been obtained in pickup devices of the invention using these materials in the measurement of pressures, both static and pulsating, and in controlling indicating apparatus.

The pickup device is connected to a suitable source of alternating current and to an apparatus for indicating the variations in output voltage from the device. The pressure or force to be measured, either steady or pulsating, is then applied to one side of the pressure responsive diaphragm and a reference pressure, which may be atmospheric pressure or any other desired pressure above or below atmospheric, is applied to the other side of the diaphragm. The readings of the instrument when compared with a calibration curve based on known pressure differences will give the magnitude of the first-mentioned pressure with respect to the reference pressure.

While the forms of the invention shown and described herein are admirably adapted to fulfill the objects primarily stated, it is to be understood that it is not intended to confine the invention to the forms disclosed herein, for it is susceptible of embodiment in various other forms all coming within the purview of the invention.

What is claimed is:

A static pressure gauging device comprising, in combination, a pair of disc-like elements of magnetic material, each element having an annular recess therein forming a peripheral side wall and central pole piece, a disc-like flexible flux-carrying diaphragm, means securing the diaphragm between the peripheral side walls of said elements, said diaphragm together with the recesses in the elements forming a pressure chamber on each side of the diaphragm, and said diaphragm forming an integral part of a magnetic circuit with each disc-like element and being spaced from the pole pieces to form a single short air gap on each side of the diaphragm, two transformers, one for each magnetic circuit, each transformer including primary and secondary coils located on the pole piece of its related magnetic circuit, means for supplying alternating current at constant voltage to the primary windings of both transformers, indicating means connected to the secondary windings of both transformers, means to introduce a reference pressure in one pressure chamber, and means to introduce a pressure to be indicated or measured in the other pressure chamber, differences in pressures in the chambers causing the diaphragm to flex and vary the length of the air gaps inversely to vary the reluctance of the magnetic circuits and the voltages that will be induced in the secondary coils for a given voltage applied to the primary coils.

References Cited in the file of this patent

UNITED STATES PATENTS

| Number | Name | Date |
|---|---|---|
| 277,199 | Baxter | May 8, 1883 |
| 355,032 | Schneekloth | Dec. 28, 1886 |
| 950,799 | Wilson | Mar. 1, 1910 |
| 988,044 | Stuart | Mar. 28, 1911 |
| 1,034,200 | Carroll | July 19, 1912 |
| 1,362,008 | Kane | Dec. 14, 1920 |
| 1,525,182 | Hayes | Feb. 3, 1925 |
| 1,630,380 | Hanna | May 31, 1927 |
| 1,718,494 | Schurig | June 25, 1929 |
| 1,939,898 | Hunter | Dec. 19, 1933 |
| 2,015,674 | Hayes | Oct. 1, 1935 |
| 2,260,837 | Kuehni | Oct. 28, 1941 |
| 2,376,156 | Kuehni | May 15, 1945 |
| 2,430,757 | Conrad et al. | Nov. 11, 1947 |
| 2,440,605 | Hathaway | Apr. 27, 1948 |
| 2,445,455 | Rights et al. | July 20, 1948 |
| 2,459,155 | Erickson | Jan. 18, 1949 |
| 2,581,359 | Clark | Jan. 8, 1952 |